United States Patent [19]

Grosse-Scharmann et al.

[11] Patent Number: 4,718,499
[45] Date of Patent: Jan. 12, 1988

[54] TRACTOR-POWERED CULTIVATOR WITH SWINGABLE BAFFLES

[75] Inventors: Franz Grosse-Scharmann; Reinhard Higgen, both of Hude; Reinhard Gieseke, Oldenburg; Bernd Gattermann, Hude, all of Fed. Rep. of Germany

[73] Assignee: Amazonen Werke H. Dreyer GmbH & Co. KG, Hasbergen-Gaste, Fed. Rep. of Germany

[21] Appl. No.: 792,951

[22] Filed: Oct. 30, 1985

[30] Foreign Application Priority Data

Nov. 2, 1984 [DE] Fed. Rep. of Germany ....... 3440106

[51] Int. Cl.[4] ............................................. A01B 49/02
[52] U.S. Cl. ...................................... 172/68; 172/112
[58] Field of Search .................... 172/68, 71, 81, 101, 172/102, 112, 509, 49.5, 123

[56] References Cited

U.S. PATENT DOCUMENTS

| | | | |
|---|---|---|---|
| 1,157,129 | 10/1915 | Starr | 172/509 X |
| 4,051,904 | 10/1977 | van der Lely et al. | 172/68 X |
| 4,088,083 | 5/1978 | Dail, Jr. et al. | 172/68 X |
| 4,436,161 | 3/1984 | van der Lely | 172/68 X |

FOREIGN PATENT DOCUMENTS

| | | | |
|---|---|---|---|
| 83404 | 7/1983 | European Pat. Off. | 172/112 |
| 118868 | 9/1984 | European Pat. Off. | 172/112 |
| 2725233 | 12/1977 | Fed. Rep. of Germany | 172/112 |
| 2749148 | 5/1978 | Fed. Rep. of Germany | . |
| 2728432 | 1/1979 | Fed. Rep. of Germany | . |
| 2945062 | 5/1981 | Fed. Rep. of Germany | . |
| 2371865 | 6/1978 | France | . |
| 2416634 | 9/1979 | France | . |
| 7206943 | 11/1973 | Netherlands | . |
| 2019702 | 11/1979 | United Kingdom | 172/112 |

*Primary Examiner*—Richard T. Stouffer
*Attorney, Agent, or Firm*—Sprung Horn Kramer & Woods

[57] ABSTRACT

A tractor-powered cultivator with powered cultivating tools, with a trailing roller behind the tools, and with upright baffles that extend at least approximately along the direction of travel, that are positioned laterally next to the outer tools to block the clods of earth thrown to the side by the tools, and that can be raised up and down along with the roller. To provide universally applicable lateral baffles for various types of cultivator, the baffles are fastened to the frame of the roller.

18 Claims, 9 Drawing Figures

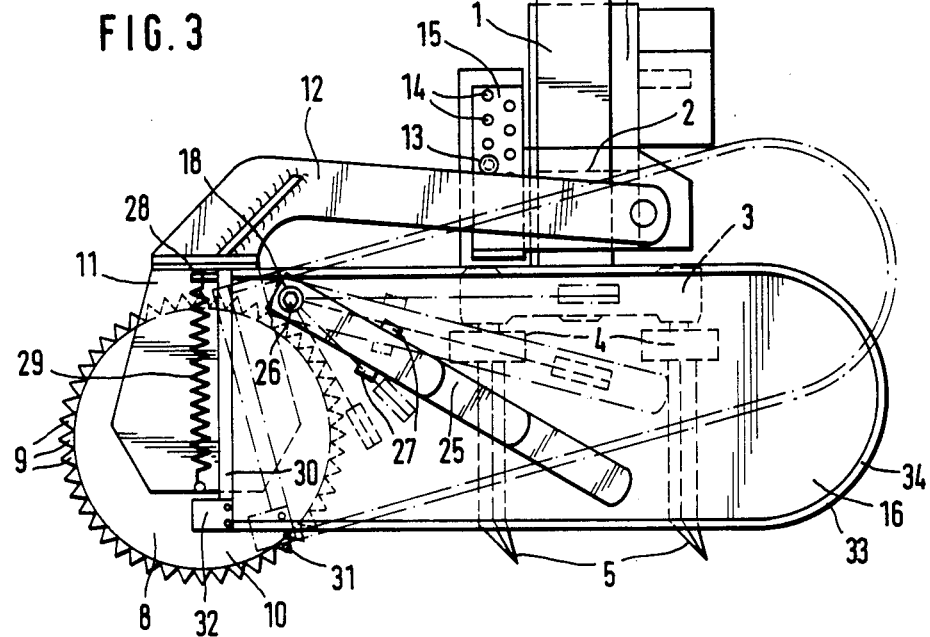
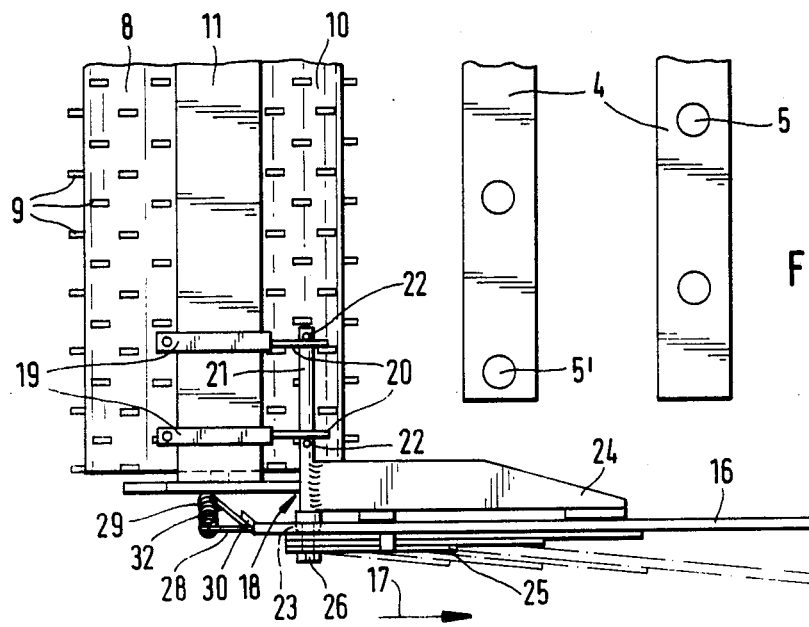
FIG. 3
FIG. 4

TRACTOR-POWERED CULTIVATOR WITH SWINGABLE BAFFLES

BACKGROUND OF THE INVENTION

The present invention relates to a tractor-powered cultivator with powered cultivating tools, with a trailing roller behind the tools, and with upright baffles that extend at least approximately along the direction 17 of travel, that are positioned laterally next to the outer tools to block the clods of earth thrown to the side by the tools, and that can be raised up and down along with the roller.

A cultivator of this type is known from U.S. Pat. No. 4,088,083. The lateral baffles, which are in the form of plates, in this cultivator, are rigidly fastened by struts at the front and rear to the arms that support the roller. The baffles must, when the height of the cultivator is adjusted in relation to the arms that support the roller, also be adjusted in relation to the supporting arms because the position of the arms changes in relation to the ground. Another drawback to the known lateral baffles is that they can only be employed with circular self-cleaning harrows. Still another drawback, finally, is that earth flies laterally out from between the baffle and the roller, creating a wall. The wall is a decided disadvantage in that, when the cultivator is employed with a seed drill following the roller, the depth of deposit of the already sowed grain is increased on the adjacent strips, preventing or delaying sprouting and damaging the harvest. The walls also get in the way of the thresher.

SUMMARY OF THE INVENTION

The object of the present invention is to provide universally applicable lateral baffles for various types of cultivator.

This object is attained in accordance with the invention by means of a cultivator wherein the baffles are fastened to the frame of the roller.

This measure makes it possible to employ baffles positioned on a roller along with various types of cultivator having the same operating width. It accordingly becomes possible for example to employ the baffles with either a vibrating harrow, a circular self-cleaning harrow, or a circular lister. Finally, the baffles can be positioned far enough back and close to the roller to prevent the loose clods of earth thrown up by the cultivator tools from flying laterally out between the cultivator and the roller and to distribute them uniformly over the operating width of the roller. This is ensured in every desired operating position of the cultivator. Furthermore, it is unnecessary to adjust the baffles when the operating depth of the cultivator tools is changed because the roller on the frame of which the baffles are fastened always rolls along the ground. Finally, the baffles can extend very far forward and accordingly also prevent clods from flying out laterally next to and in front of the cultivator. Even when the baffles are that long, it will not be necessary to readjust them when the operating depth of the tools is changed or when the cultivator is lowered or raised.

Clods are also prevented from flying out laterally between the cultivator and the roller in accordance with the invention in that the baffles can extend at least to the forward edge of the roller 8 along the direction of travel.

To ensure reliable screening even when the soil flies very freely, the baffles can extend at least to the surface where the roller comes into contact with the ground.

To make it possible to retain the same adjustment of the baffles at different settings of the cultivator, the baffles in one embodiment have at the rear a fastener that attaches them to the frame of the roller.

Thus, the operating position of the baffles is determined strictly by the roller and the ground.

The same advantage, however, can be achieved if the baffles are fastened with a fastener to the supporting arms between the roller 8 and the cultivator. Care must be taken in this embodiment to ensure that the baffle fastener is positioned on the supporting arms very close to the roller along the direction of travel.

To prevent damage to the baffles by allowing them to yield laterally when hard objects get caught between the baffles and the cultivator and by allowing them to yield upward if the baffles encounter irregularities in the ground or stubborn obstacles in the soil, the fastener that attaches the baffles to the roller can be a cardan joint. Alternately, the fastener can be a ball joint. The mounts in such an embodiment can be maintained in their operating position with resilient structures.

In one preferred embodiment of the invention, resilient structures can be positioned on the outside of each baffle to keep the baffles in their operating position. This measure protects the resilient structures and prevents them from obstructing the flow of soil toward the rear. If the resilient structures are leaf springs, they will be strong and take up very little space. The resilient structures can be positioned on the fastener for the baffles.

A resilient structure can be positioned between the inside of the front of each baffle and the frame of the cultivator to maintain the baffles in their operating position.

Alternatively, a resilient structure can be positioned on the inside of each baffle and the frame of the arms that support the roller to maintain the baffles in their operating position.

Moreover, a resilient structure can be positioned between a structure that extends back from the baffle to beyond the fastener and the frame of the roller. This resilient structure, which acts like a leaf spring, allows the baffles to be lifted with very little effort to keep straw out from in front of the baffles, which is very practical for soils that contain a lot of straw. Even when there is very little straw or mixture of straw and soil, the baffles will yield forward and up, and the straw will readily slide beneath them without clogging them or forming piles. The force of the spring can be varied to relieve as much load as desired or reduce the pressure of the baffles against the ground.

A limiter that the resilient structures force the baffles against, can be positioned on the inside of each baffle. The limiters can be positioned on the cultivator.

The limiter can be positioned on the frame of the roller or on its supporting arms.

The baffles can have a section that slants up and forward on the bottom of their front. Further, the baffles will slide over the ground especially readily without pushing straw ahead of them when, as in one embodiment of the invention, their edge is rounded. The edge of the the baffles can be rounded off with a tube for example. At least the bottom of the baffles can be beveled toward the roller.

Some preferred embodiments of the invention will now be described with reference to the attached drawings, wherein:

BRIEF DESCRIPTION OF THE DRAWINGS

FIG. 3 is a larger-scale side view of the cultivator illustrated in FIG. 1 with a roller and lateral baffle, FIG. 4 is a top view of the lateral baffle illustrated in FIG. 3.

DETAILED DESCRIPTION OF THE PREFERRED EMBODIMENTS

Figure 1:
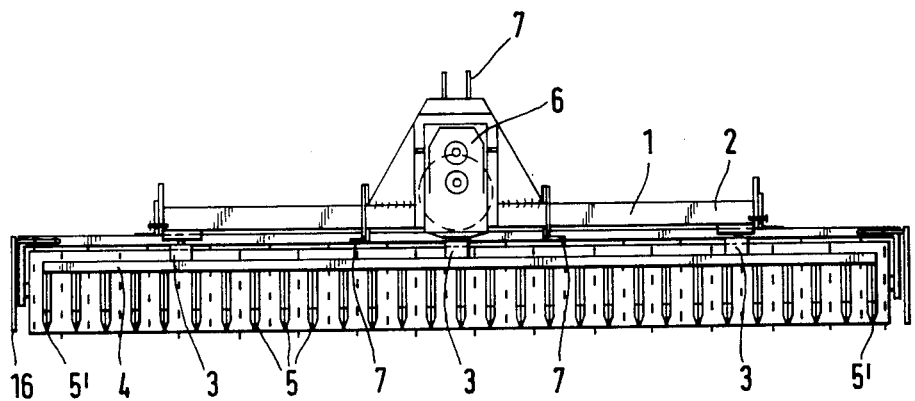
FIG. 1 is a front view of a cultivator with a trailing roller in accordance with the invention.
Figure 2:
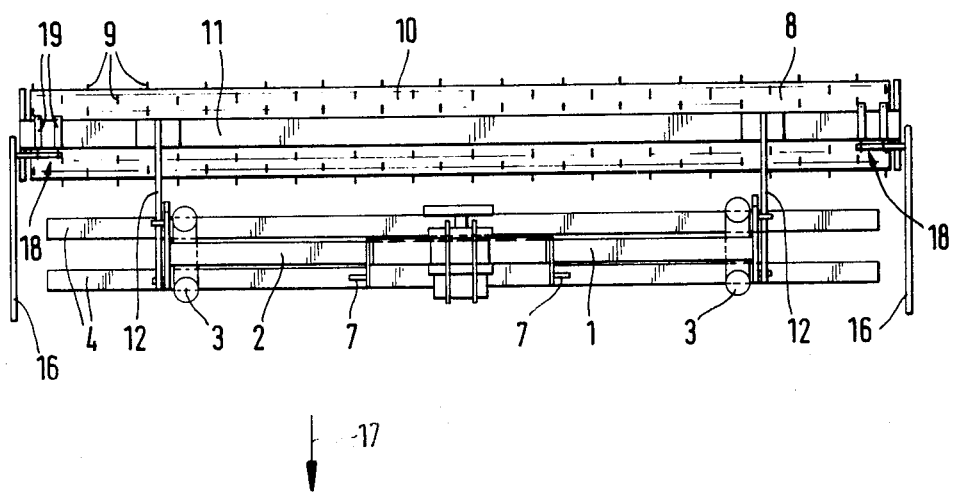
FIG. 2 is a top view of the cultivator illustrated in FIG. 1.

The cultivator illustrated in FIGS. 1 to 4 is a vibrating harrow 1. Two harrow beams 4 with cultivating tools in the form of prongs 5 are mounted on the frame 2 of vibrating harrow 1 by means of rockers 3. The harrow beams 4 and hence the prongs 5 are oscillated by means of a wobble drive 6 powered in a known way from the takeoff shaft of the tractor, not illustrated, that pulls the cultivator. Couplings 7 are positioned on frame 2 for attaching vibrating harrow 1 in a known way to the three-point suspension of the tractor.

Behind vibrating harrow 1 is a trailing roller in the form of a packer roller 8. Packer roller 8 has a main section 10 studded with teeth 9 that rotates in a frame 11. Supporting arms 12 are positioned on frame 11 and connect packer roller 8 to the frame 2 of vibrating harrow 1. The depth of penetration of prongs 5 is determined through packer roller 8 by means of limiting bolts 13 on the frame 2 of vibrating harrow 1 that rest on supporting arms 12. A particular operating depth can be selected by inserting limiting bolts 13 in different bores 14 in setting mechanisms 15 on the frame 2 of vibrating harrow 1.

Baffles in the form of lateral plates 16 are positioned on each side of the cultivator next to outer prongs 5'. Lateral plates 16 are upright and extend along the direction 17 of travel of vibrating harrow 1. Lateral plates 16 block the clods of earth thrown out by prongs 5 and extend when vibrating harrow 1 is in operation at least approximately down to the ground. Each lateral plate 16 is articulated to the frame 11 of packer roller 8 with a fastener 18. Each fastener 18 has two straps 19 rigidly clamped to the frame 11 of packer roller 8. Bearing brackets 20 are welded to straps 19. A fastener shaft 21 is positioned in bearing brackets 20 and secured with pins 22. A lateral plate 16 is mounted on each end of fastener shaft 21 with a ball joint 23. Between lateral plate 16 and bearing bracket 20, a limiter 24 that determines the position of the plate is welded to fastener shaft 21. Resilient structures in the form of leaf springs 25 that maintain the plate in its operating position against limiter 24 are positioned on the outside of lateral plate 16. Leaf springs 25 are secured to fastener 18 with a screw 26 that screws into the face of fastener shaft 21. To prevent leaf springs 25 from slipping of lateral plate 16 blocks 27 are welded to each plate next to each set of springs. On the rear of each lateral plate 16 is a structure 28 that extends back beyond ball joint 23. Between structure 28 and the frame 11 of packer roller 8 is a resilient structure in the form of a tension spring 29. Tension spring 29 can be attached to structure 28 at various distances from ball joint 23.

The rear edge 30 of each lateral plate 16 extends back beyond the forward edge of packer roller 8 along the direction 17 of travel and approximately to the surface 31 of the roller that contacts the ground. The rear of lateral plate 16 is beveled toward packer roller 8, and a piece 32 of sheet metal that extends toward the roller is screwed to the bottom rear of the plate. This seals off the space between packer roller 8 and lateral plates 16 so that no clods of earth can emerge laterally between the cultivator and the roller. Lateral plates 16 extend forward along the direction 17 of travel beyond the prongs 5 on vibrating harrow 1. The lower front 33 of each lateral plate 16 has a section that slants forward and up and merges into a curve at the top of the plate. Each lateral plate 16 is edged with a tube 34, providing a round cross-section.

Ball joint 23 allows each lateral plate 16 to yield up into the position indicated by the dot-and-dash line in FIG. 3. Furthermore, when a stone for example becomes lodged between between a lateral plate 16 and outer prongs 5', the plate can yield laterally against the force of leaf springs 25 into the position illustrated by the dot-and-dash lines in FIG. 4. Thus, ball joint 23 allows lateral plate 16 to yield along any plane that may be necessary against the force of leaf springs 25.

The tension spring 29 between the frame 11 of packer roller 8 and the structure 28 on lateral plate 16 that extends beyond ball joint 23 allows lateral plate 16 to be lifted with very little effort to prevent straw for example from getting pushed along in front of the plate. Even when there is very little straw present, the plate will yield up and out into the position indicated by the dot-and-dash lines in FIG. 3 and will not get jammed by piles of straw.

Since lateral plate 16 is mounted or fastened only at the rear in the vicinity of packer roller 8, it is no longer necessary to adjust the height of the plate in relation to packer roller 8 or vibrating harrow 1 separately. Fastening lateral plate 16 to the frame 11 of packer roller 8 makes it unnecessary to readjust the plate because the roller will always roll along the ground. Lateral plates 16 will always automatically adjust to any position of vibrating harrow 1 and to any operating depth of prongs 5.

Mounting or fastening lateral plates 16 at the rear in the vicinity of packer roller 8 more or less completely seals off the space between the roller and the plate and prevents clods of earth from being thrown out laterally between them. The seal is ensured in any operating position of vibrating harrow 1 in relation to packer roller 8.

Figure 5:
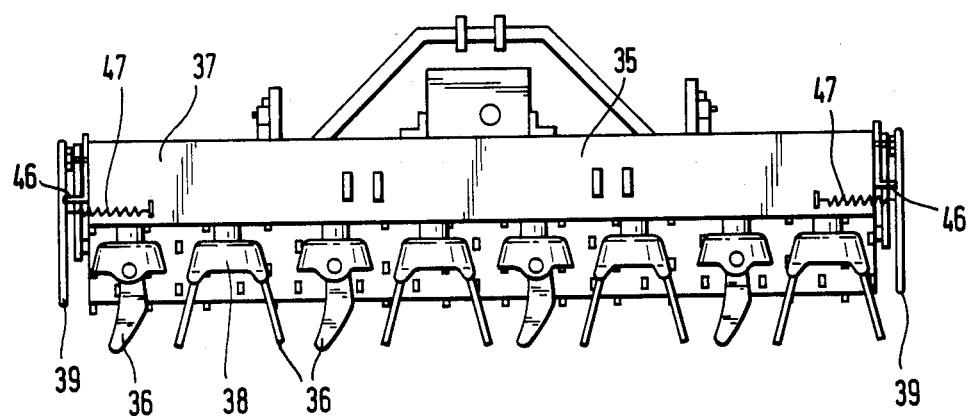
FIG. 5 is a front view of another embodiment of a cultivator with a trailing roller in accordance with the invention.
Figure 6:
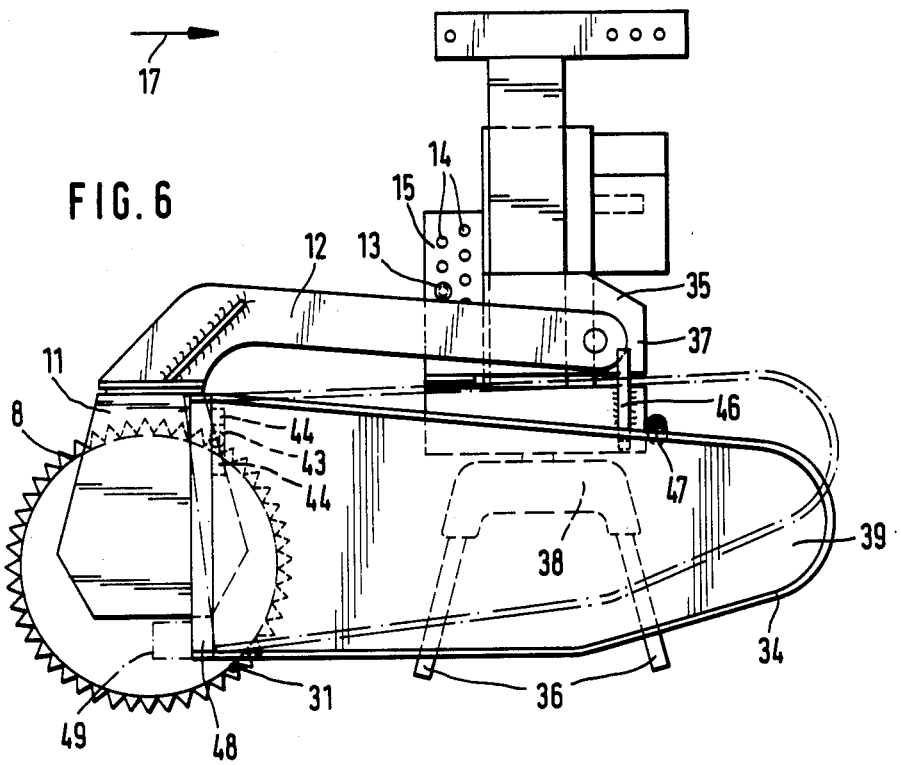
FIG. 6 is a larger-scale side view of the cultivator illustrated in FIG. 1 with a roller and lateral baffle.
Figure 7:
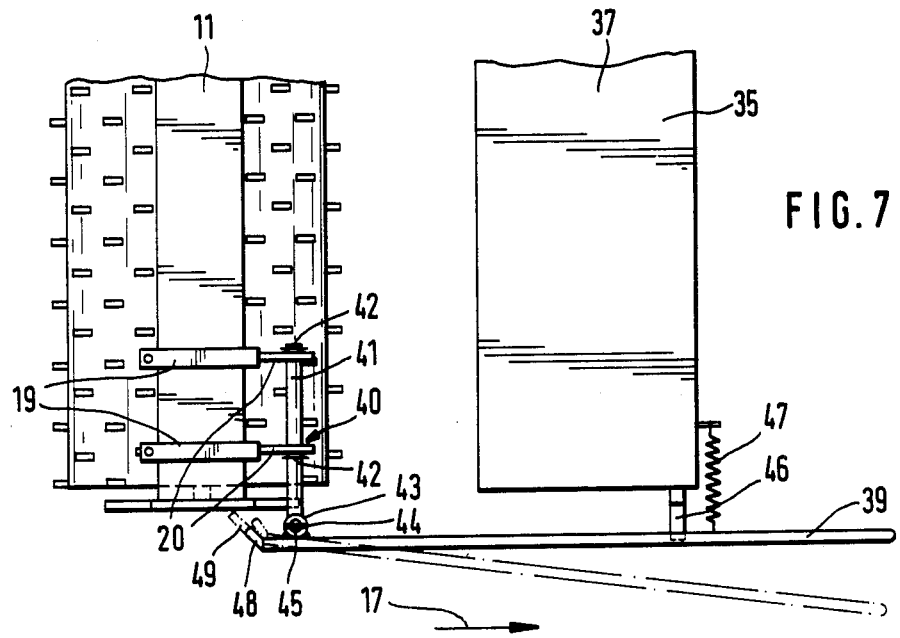
FIG. 7 is a top view of the lateral baffle illustrated in FIG. 6.

The cultivator in FIGS. 5 to 7 is a circular lister 35. The tools, in the form of prongs 36, are powered in a known way from the takeoff shaft of the tractor, not illustrated, that tows the lister over the field. Behind circular lister 35 is a trailing roller in the form of a packer roller 8. Packer roller 8 has a frame 11. The supporting arms 12 that connect packer roller 8 to the frame 37 of circular lister 35 are positioned on roller frame 11. The depth of penetration of prongs 36 is determined through packer roller 8 by means of limiting bolts 13 on the frame 11 of circular lister 35 that rest on supporting arms 12. A particular operating depth can be selected by inserting limiting bolts 13 in different bores 14 in setting mechanisms 15 on the frame 2 of circular lister 35.

Baffles in the form of lateral plates 39 are positioned on each side of the cultivator next to outer rotors 38, which prongs 36 are attached to. Lateral plates 39 are upright and extend along the direction 17 of travel of circular lister 35. Lateral plates 39 block the clods of earth thrown out by prongs 36 and extend when circular lister 35 is in operation at least approximately down to the ground. Each lateral plate 39 is articulated to the frame 11 of packer roller 8 with a fastener 40 in the form of a cardan joint. Each fastener 40 has two straps 19 rigidly clamped to the frame 11 of packer roller 8. Bearing brackets 20 are welded to straps 19. A fastener shaft 41 is positioned in bearing brackets 20 and secured with securing rings 42. A bushing 43 is mounted on each end of fastener shaft 41. Two other bushings 44 are welded to the upper rear of lateral plates 39. A bolt 45 extends through bushings 43 and 44 to articulate lateral plates 39 to fastener shaft 41. A limiter 46 that limits the swing of the plate toward prongs 36 is welded to the frame 37 of circular lister 35. A resilient structure in the form of a tension spring 47 that maintains the plate in its operating position is positioned between each lateral plate 39 and the frame 37 of circular lister 35.

The rear edge 48 of each lateral plate 39 extends back beyond the forward edge of packer roller 8 along the direction 17 of travel and approximately to the surface 31 of the roller that contacts the ground. The rear of lateral plate 39 is beveled toward packer roller 8, and a piece 49 of sheet metal, indicated with a broken line, can also be screwed to the bottom rear of the plate. Lateral plates 39 extend forward along the direction 17 of travel beyond circular lister 35. The lower front of each lateral plate 39 has a section that slants forward and up and merges into a curve at the top of the plate. Each lateral plate 39 is edged with a tube 34, providing a round cross-section.

Cardan-joint fastener 40 allows each lateral plate 39 to yield up into the position indicated by the dot-and-dash line in FIG. 6 and to the side into the position indicated by the dot-and-dash line in FIG. 7. The results are the same as described with reference to the embodiment illustrated in FIGS. 1 to 4.

Figure 8:
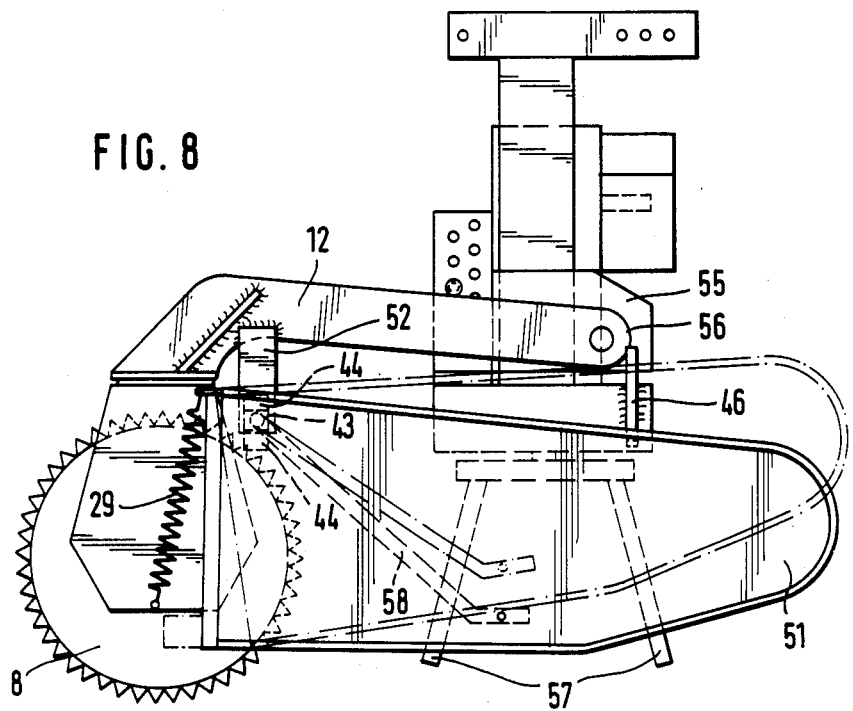
FIG. 8 is a side view of another embodiment of a cultivator with a trailing roller and baffle in accordance with the invention.
Figure 9:
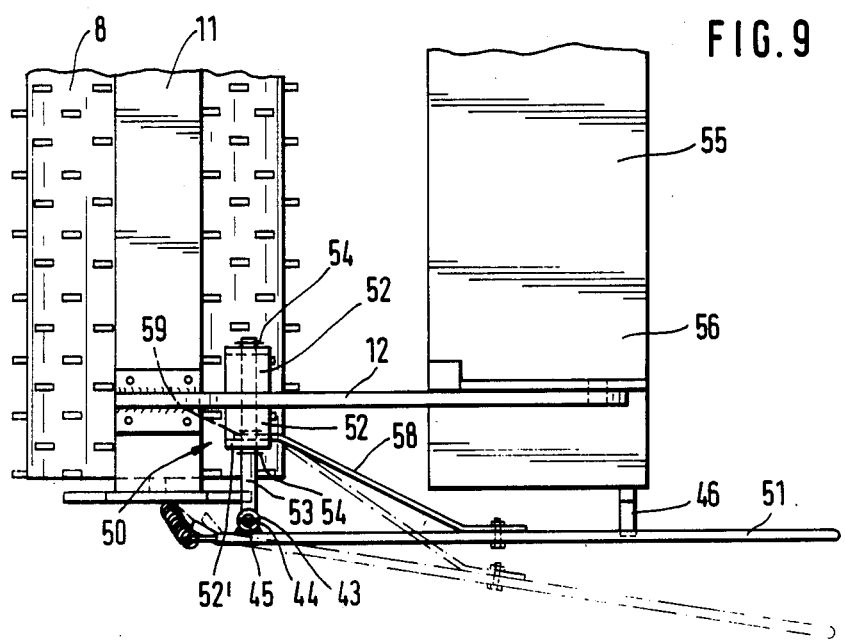
FIG 9 is a top view of the lateral baffle illustrated in FIG. 8.

The embodiment illustrated in FIGS. 8 and 9 differs essentially from that illustrated in FIGS. 5 to 7 in the position of the mechanism that fastens the lateral plates to the trailing roller. The fastener 50 that connects each lateral plate 51 to the frame of packer roller 8 is again a cardan joint. It has bearing bracket 52 welded to supporting arms 12. A fastener shaft 53 is secured in bearing bracket 52 by means of securing rings 54. At each end of fastener shaft 53 is a bushing 43. Two other bushings 44 are welded to the upper rear of lateral plates 51. A bolt 45 extends through bushings 43 and 44, articulating lateral plates 51 to fastener shaft 53. A limiter 46 that limits the swing of each lateral plate 51 toward prongs 57 is fastened to the frame 55 of the cultivator, which is in this case a circular self-cleaning harrow 56. A resilient structure in the form of a leaf spring 58 that maintains the plate in its operating position is positioned between each lateral plate 51 and the frame 11 of circular lister 35. The bottom end of leaf spring 58 is beveled and screwed to lateral plates 51. Leaf spring 58 is also beveled at the top. There is a bore 59 in the beveled top of leaf springs 58 for fastening the spring to fastener shaft 53 in front of bearing bracket 52'. Leaf springs 58 can if necessary be slightly bent in to obtain a longer range for the lateral yield of plate 51 as indicated by the dot-and-dash lines in FIG. 9. The plate can also yield up into the position indicated by the dot-and-dash lines in FIG. 8, in which fastener shaft 53 is rotated in the bearing brackets.

It will be appreciated that the instant specification and claims are set forth by way of illustration and not limitation, and that various modifications and changes may be made without departing from the spirit and scope of the present invention.

We claim:

1. In a tractor-operated cultivator movable in a direction of travel and having powered cultivating tools, a trailing roller behind the cultivating tools in the direction of travel, vertically oriented baffles mounted on the trailing roller, extending at least approximately along the direction of travel, and positioned laterally next to outer ones of said cultivating tools in their operating positions to block the clods of earth thrown out to the side by the cultivating tools, means mounting each of the baffles for swinging movement around a pivot while retaining their vertical orientation, the improvement wherein the means mounting each of the baffles comprises a fastener including said pivot and connecting a rear portion of a respective one of the baffles with the trailing roller in the vicinity of the pivot and wherein the fastener includes another pivot that extends horizontally across the direction of travel to permit each of the baffles to yield horizontally and vertically, while retaining their vertical orientation.

2. The cultivator as in claim 1, wherein the baffles extend at least to the forward edge of the roller along the direction of travel.

3. The cultivator as in claim 2, wherein the baffles extend at least to the bottom of the roller.

4. The cultivator as in claim 1, further comprising a cultivator frame and wherein the includes supporting arms and the means mounting the baffles comprises a fastener connecting the baffles to the supporting arms between the roller and the cultivator frame.

5. The cultivator as in claim 1, wherein the fastener comprises a cardan joint.

6. The cultivator as in claim 1, wherein the fastener comprises a ball joint.

7. The cultivator as in claim 1, wherein the means mounting the baffles include resilient means for maintaining the baffles in their operating positions.

8. The cultivator as in claim 7, wherein the resilient means are positioned on the outside of each of said baffles.

9. The cultivator as in claim 7, wherein the resilient means comprises leaf springs.

10. The cultivator as in claim 1, wherein the means mounting the baffles comprises resilient means positioned on the fastener for maintaining the baffles in the operating positions.

11. The cultivator as in claim 10, further comprising a cultivator frame and wherein the mounting means comprises a structure that extends back from each of the baffles to beyond its respective one of the fasteners and wherein the resilient means is positioned between the structure and the frame.

12. The cultivator as in claim 11, further comprising limiters against which the resilient means force the baffles, said limiters disposed at the inside of each of said baffles.

13. Cultivator as in claim 12, wherein the limiters are positioned on the frame.

14. The cultivator as in claim 1, further comprising a cultivator frame and wherein the means mounting the baffles comprises resilient means positioned between the inside of the front of each of said baffles and the cultivator frame to maintain the baffles in their operating position.

15. The cultivator as in claim 1, wherein the baffles each have a section that slants up and forward on the bottom front thereof.

16. The cultivator as in claim 1, wherein the baffles have edges that are rounded at least at the bottom of the front.

17. The cultivator as in claim 1, wherein the edges of the baffles are rounded off with a tube.

18. The cultivator as in claim 1, wherein at least the bottoms of the baffles are beveled toward the roller.

* * * * *

UNITED STATES PATENT AND TRADEMARK OFFICE
CERTIFICATE OF CORRECTION

PATENT NO. : 4,718,499

DATED : January 12, 1988

INVENTOR(S) : Franz Grosse-Scharmann, et al

It is certified that error appears in the above-identified patent and that said Letters Patent is hereby corrected as shown below:

Col. 6, line 45        After "wherein the" insert --frame--

Signed and Sealed this

Twentieth Day of September, 1988

Attest:

DONALD J. QUIGG

*Attesting Officer*        *Commissioner of Patents and Trademarks*